No. 776,776. PATENTED DEC. 6, 1904.
C. F. DIETZ.
METHOD OF AND APPARATUS FOR DIVIDING DOUGH.
APPLICATION FILED JUNE 14, 1904.
NO MODEL. 2 SHEETS—SHEET 1.
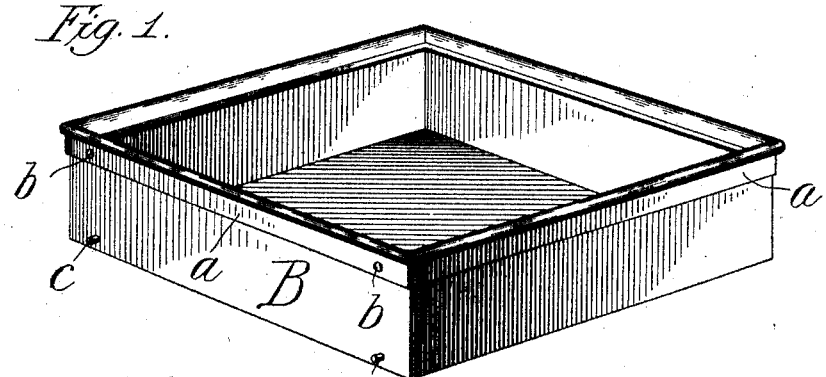
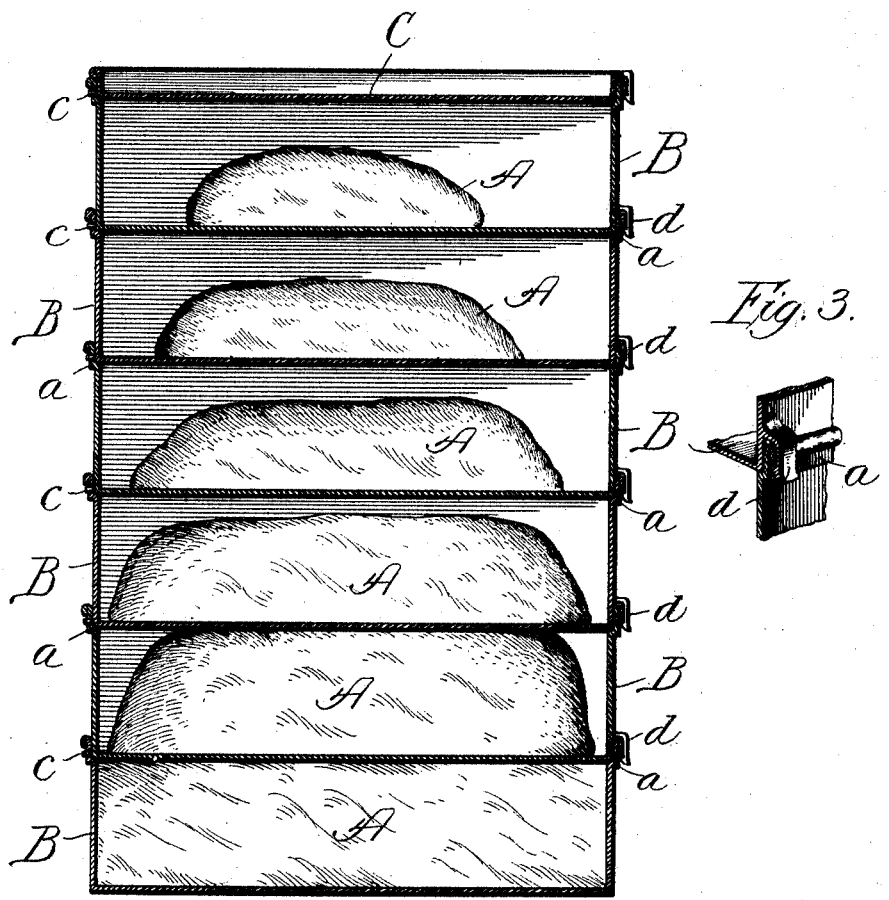
Witnesses:
Chas. E. Gaylord.
John Enders.
Inventor:
Christian F. Dietz,
By Dyrenforth, Dyrenforth & Lee,
Attys.

No. 776,776. PATENTED DEC. 6, 1904.
C. F. DIETZ.
METHOD OF AND APPARATUS FOR DIVIDING DOUGH.
APPLICATION FILED JUNE 14, 1904.
NO MODEL. 2 SHEETS—SHEET 2.
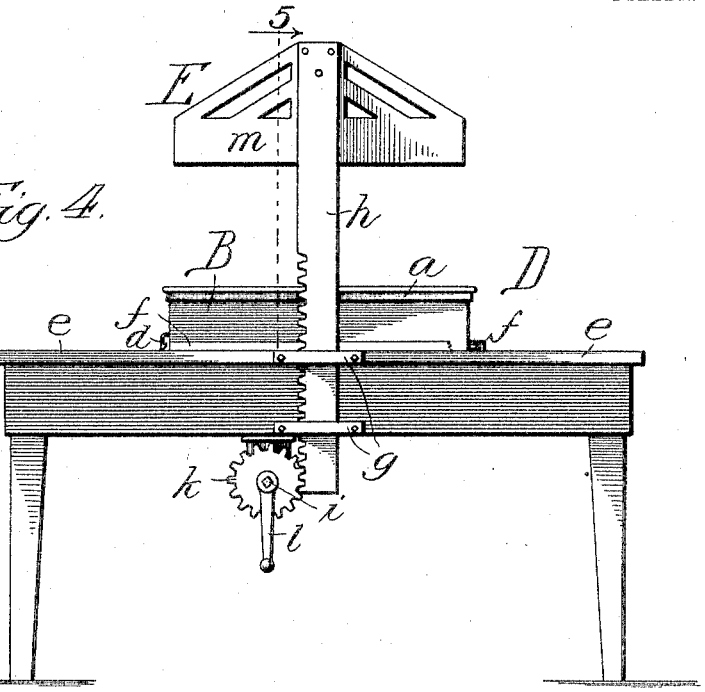
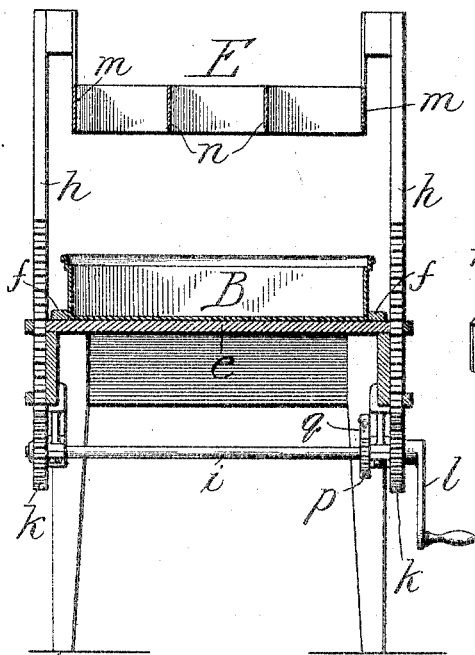
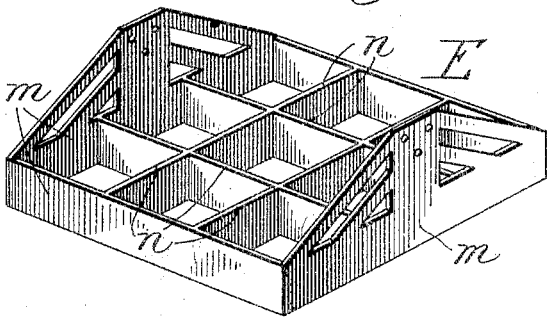
Witnesses:
Chas. E. Gaylord.
John Enders.
Inventor:
Christian F. Dietz,
By Dyrenforth, Dyrenforth, & Lee,
Att'ys.

No. 776,776. Patented December 6, 1904.

UNITED STATES PATENT OFFICE.

CHRISTIAN F. DIETZ, OF CHICAGO, ILLINOIS.

METHOD OF AND APPARATUS FOR DIVIDING DOUGH.

SPECIFICATION forming part of Letters Patent No. 776,776, dated December 6, 1904.

Application filed June 14, 1904. Serial No. 212,459. (No model.)

*To all whom it may concern:*

Be it known that I, CHRISTIAN F. DIETZ, a citizen of the United States, residing at Chicago, in the county of Cook and State of Illinois, have invented a new and useful Improvement in Methods of and Apparatus for Dividing Dough, of which the following is a specification.

My invention relates to a step in the process of making fermented bread, and is an improved method of dividing finished dough into lumps of desired uniform size or weight preparatory for the molding and baking operations.

In the practice of my improved method the "finished" dough previous to the final fermentation in which it is "proofed" is "scaled off" into comparatively large masses of desired weight and each mass is placed in a receptacle or tray. Here the mass in each instance is permitted to swell under further fermentation and caused to expand in a manner to fill out the tray. The tray is then passed into a cutting-machine having a series of dividers, which in a single operation reduce the mass into a plurality of lumps, each of a weight required for a loaf.

My object is to provide a method and means for dividing dough into lumps of uniform weight in a particularly quick and desirable manner; and to this end my invention consists in the improved method above outlined and also in the improved means which I employ for carrying out the said method.

In the accompanying drawings I show apparatus of a desirable construction for use in practicing my invention.

Referring to the drawings, Figure 1 is a perspective view of a tray into which a mass of dough of predetermined weight is placed to undergo swelling; Fig. 2, a sectional view of a nest of trays indicating in an exaggerated degree for purposes of illustration the manner in which each mass of dough expands to fill out its tray; Fig. 3, an enlarged broken sectional detailed view of catch mechanism for fastening the trays together when nested; Fig. 4, a side elevation of a dough-dividing machine of a construction adapted for carrying out one step of the method; Fig. 5, a section on line 5 in Fig. 4, and Fig. 6 a perspective view of a plunger-frame having cutting edges and forming one of the details of construction of the said machine.

The machine illustrated is adapted for dividing a mass of dough into nine lumps of uniform size. Presuming that the method and mechanism are to be employed in the process of turning out loaves of bread each weighing one pound, the mechanism would be constructed to divide the dough into lumps of, say, eighteen ounces each, to allow for evaporation during the baking operation. In operation, therefore, masses A of finished dough, each weighing ten pounds and two ounces, would be placed in trays B. The trays are formed with flanges $a$ at their upper edges, provided at one side with perforations $b\ b$. Beneath the perforations $b$ in the positions shown are pins $c$. On the opposite sides of the trays in the positions shown are spring-catches $d$. The trays may be nested together, as shown in Fig. 2, their bases fitting into the expanded flange portions of the trays beneath them. In forming a nest a tray is passed at its pins $c$ through the perforations $b$ of the tray next beneath it and then allowed to drop, whereby its catches $d$ engage the flange of the said lower tray. This locks the two trays separably together. As many trays as desired may be thus nested, the topmost being provided with a cover C, also provided with pins and catches whereby it may be locked in position.

For convenience of illustration a nest of six trays B is shown in Fig. 2, and the said figure also illustrates in an exaggerated manner how a mass of dough expands to fill out a receptacle. A mass A ready to be divided and of the desired weight might in practice be of the relative size shown in the top tray B. Under the fermenting action the mass would gradually swell to the size shown in the second tray from the top, then to the size indicated in the third tray, and so on until, as shown in the bottom tray, it would completely fill out the receptacle. In practice of course all the masses in a nest of trays would fill out the receptacles in about the same length of time, and thus extend with a smooth upper surface and of a uniform thickness throughout. When the masses of dough have reached this condition, the trays are separated from the nest one at a time and passed to a dividing-machine D, which, as before stated, may be of the construction illustrated in Figs. 4, 5, and 6. The machine comprises a table or platform $e$, provided on its upper side with cleats or guides $f$, forming means for readily positioning a tray. Sliding in guides $g$ on the table are vertical racks $h$, which are raised and lowered by the turning of a shaft $i$ through the medium of pinions $k$ on the shaft which engage the rack. The shaft $i$ is provided with a handle $l$. Fastened at opposite ends to the rack-bars $h$ is a cutter-frame E, constructed with outer walls $m$ and partitions $n$, as shown, to present square openings of equal size. The lower edges of the walls $m$ and partitions $n$ are sharpened to present cutting edges. The cutter-frame is of a size to cause the walls $m$ to fit closely the inner surfaces of the walls of the trays. When a tray is placed in position upon the platform or table, the lowering of the cutter-frame causes the walls $m$ thereof to slide closely against the inner surfaces of the walls of the tray and the partitions $n$ to cut through the mass of dough in the tray and divide it in the present instance into nine lumps of equal dimensions. On the shaft $i$ is a ratchet-wheel $p$, and on the table is a pawl $q$, which may be caused to engage the ratchet to hold the racks and frame in the elevated position shown, while trays are being placed into or removed from the cutting-platform.

The chemical action which takes place in the dough while it is in the trays besides causing it to spread and swell to fill out the tray and thereby assume the desired shape for ready division into lumps of uniform weight has the further effect of causing the dough to become more tender, easy to cut, and more easy to form into loaves than when it has been subjected to external pressure to flatten it for the dividing operation. In practice the trays may be of a size to hold masses of dough of any desired weight, and the dividing-machine may be constructed to cut the mass in a single operation into any desired number of lumps destined to form loaves, rolls, or any other type of bread.

The means shown for practicing my invention may be modified in numerous ways without departing in any important particular from the spirit of my invention as defined by the claims.

What I claim as new, and desire to secure by Letters Patent, is—

1. The method of handling dough preparatory to forming it into loaves for baking, which consists in dividing a mass thereof into lumps by first subjecting it under confinement to self-expansion to the shaping limits of its confining medium, and then subjecting the shaped mass to division into a plurality of lumps.

2. The method of handling dough preparatory to forming it into loaves for baking, which consists in dividing a mass thereof into uniform lumps by first subjecting it under confinement to self-expansion to the shaping limits of its confining medium, and then subjecting the shaped mass, while in the confining medium, to division into a plurality of such lumps.

3. The combination with a dough-dividing apparatus having means for supporting and positioning a removable dough-holding receptacle, of such a receptacle provided with removable covering means, and adapted to receive the dough and permit it to expand under chemical action to the limits of its confines and thus shape itself for the dividing operation, substantially as described.

CHRISTIAN F. DIETZ.

In presence of—
WALTER N. WINBERG,
W. B. DAVIES.